United States Patent
Mansfield

(10) Patent No.: US 7,293,470 B2
(45) Date of Patent: Nov. 13, 2007

(54) TWO-WIRE BUS INSTRUMENT

(75) Inventor: William M. Mansfield, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 59 days.

(21) Appl. No.: 10/570,931

(22) PCT Filed: Sep. 30, 2003

(86) PCT No.: PCT/US03/31027

§ 371 (c)(1),
(2), (4) Date: Mar. 8, 2006

(87) PCT Pub. No.: WO2005/040735

PCT Pub. Date: May 6, 2005

(65) Prior Publication Data

US 2007/0038390 A1    Feb. 15, 2007

(51) Int. Cl.
G01F 1/84    (2006.01)
(52) U.S. Cl. .................................. 73/861.356; 702/45
(58) Field of Classification Search ............... None
See application file for complete search history.

(56) References Cited

U.S. PATENT DOCUMENTS

| 4,959,831 | A | * | 9/1990 | Wroblewski | 341/26 |
|---|---|---|---|---|---|
| 4,967,302 | A | | 10/1990 | Hutcheon et al. | |
| 5,764,891 | A | | 6/1998 | Warrior | |
| 6,144,312 | A | * | 11/2000 | Will | 340/5.2 |
| 6,226,195 | B1 | | 5/2001 | Mansfield | |
| 6,311,136 | B1 | | 10/2001 | Henry et al. | |
| 6,381,114 | B1 | | 4/2002 | Mansfield | |
| 6,456,057 | B1 | | 9/2002 | Weber et al. | |
| 6,487,507 | B1 | | 11/2002 | Mansfield et al. | |
| 2003/0126932 | A1 | | 7/2003 | Brockhaus | |
| 2003/0154804 | A1 | | 8/2003 | Henry et al. | |

FOREIGN PATENT DOCUMENTS

EP    1202139 A1    5/2002

* cited by examiner

*Primary Examiner*—Harshad Patel
(74) *Attorney, Agent, or Firm*—The Ollila Law Group LLC

(57) ABSTRACT

A two-wire bus instrument (500) adapted for use with a two-wire bus (308) is provided according to an embodiment of the invention. An instrument element (304) receives a third current and generates one or more sensor measurement signals. A signal processor (512) receives a second current and processes the one or more sensor measurement signals to produce a data signal. A communication system (511) receives a first current, receives the data signal, generates a digital communication signal including the data signal, and modulates the digital communication signal onto a two-wire bus (308). A communication power supply (501) connected across the two-wire bus (308) provides the first current to the communication system (511). A signal processing power supply (502) connected across the two-wire bus (308) provides the second current to the signal processor (512). A drive current power supply (503) connected across the two-wire bus (308) provides the third current to the instrument element (304).

19 Claims, 8 Drawing Sheets

TWO-WIRE BUS INSTRUMENT

BACKGROUND OF THE INVENTION

1. Field of the Invention

The invention is related to the field of two-wire bus instruments, and in particular, to an entirely intrinsically safe two-wire bus instrument for a hazardous environment.

2. Statement of the Problem

Flowmeters are used to measure the mass flow rate, density, and other characteristics of flowing materials. The flowing materials can comprise liquids, gases, combined liquids and gases, solids suspended in liquids, and liquids including gases and suspended solids. For example, flowmeters are widely used in the well production and refining of petroleum and petroleum products. A flowmeter can be used to determine well production by measuring a flow rate (i.e., by measuring a mass flow through the flowmeter), and can even be used to determine the relative proportions of the gas and liquid components of a flow.

One type of flowmeter environment is a hazardous environment where combustible vapors or particles are present. An instrument operating in such conditions must be designed and manufactured to avoid igniting the combustible vapors or particles. An instrument designed to safely operate in a hazardous environment is typically designated as being "intrinsically safe" (I.S.). For example, such an instrument typically uses low level electrical voltages and low level electrical currents that are known to be unable to cause ignition in a hazardous environment.

FIG. 1 shows a two-wire bus according to the prior art, such as a FIELDBUS™ two-wire bus commonly used for industrial instrumentation. The term FIELDBUS™ refers to a two-wire instrumentation bus standard that is typically used to connect together multiple instruments and is further capable of being used to provide digital communications between instruments. In addition, the fieldbus barrier device can pass digital communication signals to external devices, such as to monitoring and control stations, for example. The bus barrier device is connected to an electrical power source and provides electrical power over the two-wire bus. The bus barrier device typically receives non-I.S. electrical power and in turn provides electrical power that is current limited, voltage limited, and power limited.

Several FIELDBUS™ standards exist. One FIELDBUS™ standard specifies that the barrier device can provide a maximum current of about 130 milliamps (mA) and a maximum voltage of about 15 volts (V) to all connected instruments. In the prior art, typical fieldbus instruments were designed to draw about 10 to 20 mA. Therefore, in a prior art approach, the number of devices that can be connected to the two-wire bus is controlled by the total current consumption of the devices at the available barrier voltage.

FIG. 2 shows a typical prior art instrument connected to a two-wire bus, showing how electrical power from the two-wire bus is used. The prior art instrument includes a signal processor and an electrical interface. The electrical interface connects to a two-wire bus, such as a FIELDBUS™, and to a power source. The electrical interface includes a bus electrical barrier that connects to the two-wire bus. The bus electrical barrier provides electrical isolation from the bus and provides current, voltage, and power limiting of the electrical power taken from the two-wire bus. The two-wire bus provides Direct Current (DC) electrical power to the bus electrical barrier. The electrical interface further includes a signal electrical barrier that connects to the signal processor. The signal processor is connected to a sensor, as shown. The signal electrical barrier provides electrical isolation from the signal processor and provides current, voltage, and power limiting of the electrical power provided to the sensor via the signal processor. Where the sensor is a flowmeter sensor, such as a Coriolis flowmeter, the signal processor is typically connected to the sensor by a nine-wire cable. The electrical interface further includes a communication system. The communication system receives a data signal from the signal processor and modulates the data signal onto the two-wire bus as a digital communication signal. The FIELDBUS™ standard dictates that digital communication signals occur in a frequency band centered around 32 kilohertz (kHz).

It should be understood that in this prior art configuration, the electrical power taken from the two-wire bus is used only to power the communication system. A minimal amount of electrical power is therefore taken from the two-wire bus. For example, the communication system typically draws only about 10-20 mA from the two-wire bus. The external power source in the prior art provides the relatively large electrical power that is used to operate drivers or active elements (such as a flowtube driver(s)) and that is used to power the signal processor. As a result, making the instrument intrinsically safe is difficult and complex. Consequently, the electrical interface must include the bus electrical barrier and the signal electrical barrier. Furthermore, the instrument itself is often enclosed in an explosion-proof housing. This is done in the prior art because the power source is not intrinsically safe, even though the FIELDBUS™ two-wire bus standard originated as an intrinsically safe bus system.

SUMMARY OF THE SOLUTION

The invention helps solve the above problems by providing a two-wire bus instrument.

A two-wire bus instrument adapted for use with a two-wire bus is provided according to an embodiment of the invention. The two-wire bus instrument comprises an instrument element that receives a third current and that generates one or more sensor measurement signals. The two-wire bus instrument further comprises a signal processor that receives a second current and that processes the one or more sensor measurement signals from the instrument element to produce a data signal. The two-wire bus instrument further comprises a communication system that receives a first current and that receives the data signal from the signal processor, generates a digital communication signal including the data signal, and modulates the digital communication signal onto the two-wire bus. The two-wire bus instrument further comprises a communication power supply connected to the communication system. The communication power supply and the communication system are capable of being connected across the two-wire bus. The communication power supply is configured to provide the first current, a substantially constant voltage, and a first power to the communication system. The two-wire bus instrument further comprises a signal processing power supply connected to the signal processor. The signal processor and the signal processing power supply are capable of being connected across the two-wire bus and in parallel with the communication power supply and the communication system. The signal processing power supply is configured to provide the second current, a substantially constant voltage, and a second power to the signal processor. The two-wire bus instrument further comprises a drive current power supply connected to the instrument element. The instrument element and the drive current power supply are capable of being connected across the two-wire bus and in parallel with the communication power supply and the communication system and further in parallel with the signal processing power supply and the signal processor. The drive current power supply is configured to provide the third current, a substantially constant voltage, and a third power to the instrument element.

A two-wire bus instrument adapted for use with a two-wire bus is provided according to an embodiment of the invention. The two-wire bus instrument comprises an instrument element that receives a third current and that generates one or more sensor measurement signals. The two-wire bus instrument further comprises a signal processor that receives a second current and that processes the one or more sensor measurement signals from the instrument element to produce a data signal. The two-wire bus instrument further comprises a communication processor that receives a first current and that receives the data signal from the signal processor, generates a digital communication signal including the data signal, modulates the digital communication signal onto the two-wire bus, and transfers a first current level command to a communication power supply. The two-wire bus instrument further comprises the communication power supply that is connected to the communication processor. The communication power supply and the communication processor are capable of being connected across the two-wire bus. The communication power supply is configured to provide the first current, a substantially constant voltage, and a first power to the communication processor. The first current is provided substantially according to the first current level command. The two-wire bus instrument further comprises a voltage step-down device connected between a signal processing power supply and the signal processor and is configured to supply a predetermined voltage level to the signal processor. The two-wire bus instrument further comprises a shunt voltage regulator connected to the signal processing power supply and the voltage step-down device. The shunt voltage regulator shunts excess current not required by the signal processor. The two-wire bus instrument further comprises the signal processing power supply that is connected to the voltage step-down device and the shunt voltage regulator. The signal processing power supply, the signal processor, the voltage step-down device, and the shunt voltage regulator are capable of being connected across the two-wire bus and in parallel with the communication power supply and the communication processor. The signal processing power supply is configured to provide the second current, a substantially constant voltage, and a second power to the signal processor. The two-wire bus instrument further comprises a drive current power supply connected to the instrument element. The instrument element and the drive current power supply are capable of being connected across the two-wire bus and in parallel with the communication power supply and the communication processor and further in parallel with the signal processing power supply, the signal processor, the voltage step-down device, and the shunt voltage regulator. The drive current power supply is configured to provide the third current, a substantially constant voltage, and a third power to the instrument element.

A method of forming a two-wire bus instrument is provided according to an embodiment of the invention. The method comprises providing an instrument element that receives a third current and that generates one or more sensor measurement signals. The method further comprises providing a signal processor that receives a second current and that processes the one or more sensor measurement signals from the instrument element to produce a data signal. The method further comprises providing a communication system that receives a first current and that receives the data signal from the signal processor, generates a digital communication signal including the data signal, and modulates the digital communication signal onto the two-wire bus. The method further comprises providing a communication power supply connected to the communication system. The communication power supply and the communication system are capable of being connected across the two-wire bus. The communication power supply is configured to provide the first current, a substantially constant voltage, and a first power to the communication system. The method further comprises providing a signal processing power supply connected to the signal processor. The signal processor and the signal processing power supply are capable of being connected across the two-wire bus and in parallel with the communication power supply and the communication system. The signal processing power supply is configured to provide the second current, a substantially constant voltage, and a second power to the signal processor. The method further comprises providing a drive current power supply connected to the instrument element. The instrument element and the drive current power supply are capable of being connected across the two-wire bus and in parallel with the communication power supply and the communication system and further in parallel with the signal processing power supply and the signal processor. The drive current power supply is configured to provide the third current, a substantially constant voltage, and a third power to the instrument element.

In one aspect of the invention, the two-wire bus instrument comprises a flowmeter transmitter.

In another aspect of the invention, the two-wire bus instrument comprises a flowmeter transmitter and the instrument element comprises at least one flowtube driver and one or more pickoff sensors.

In yet another aspect of the invention, the two-wire bus instrument comprises a Coriolis flowmeter transmitter.

In yet another aspect of the invention, the two-wire bus instrument is adapted to connect to a FIELDBUS™ standard compliant two-wire bus.

In yet another aspect of the invention, a change to a third current flowing through an instrument element is limited to frequencies that do not interact with communication frequencies of a FIELDBUS™ standard compliant two-wire bus.

DESCRIPTION OF THE DRAWINGS

The same reference number represents the same element on all drawings.

DETAILED DESCRIPTION OF THE INVENTION

FIGS. 3-8 and the following description depict specific examples of the invention to teach those skilled in the art how to make and use the best mode of the invention. For the purpose of teaching inventive principles, some conventional aspects of the invention have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 3:
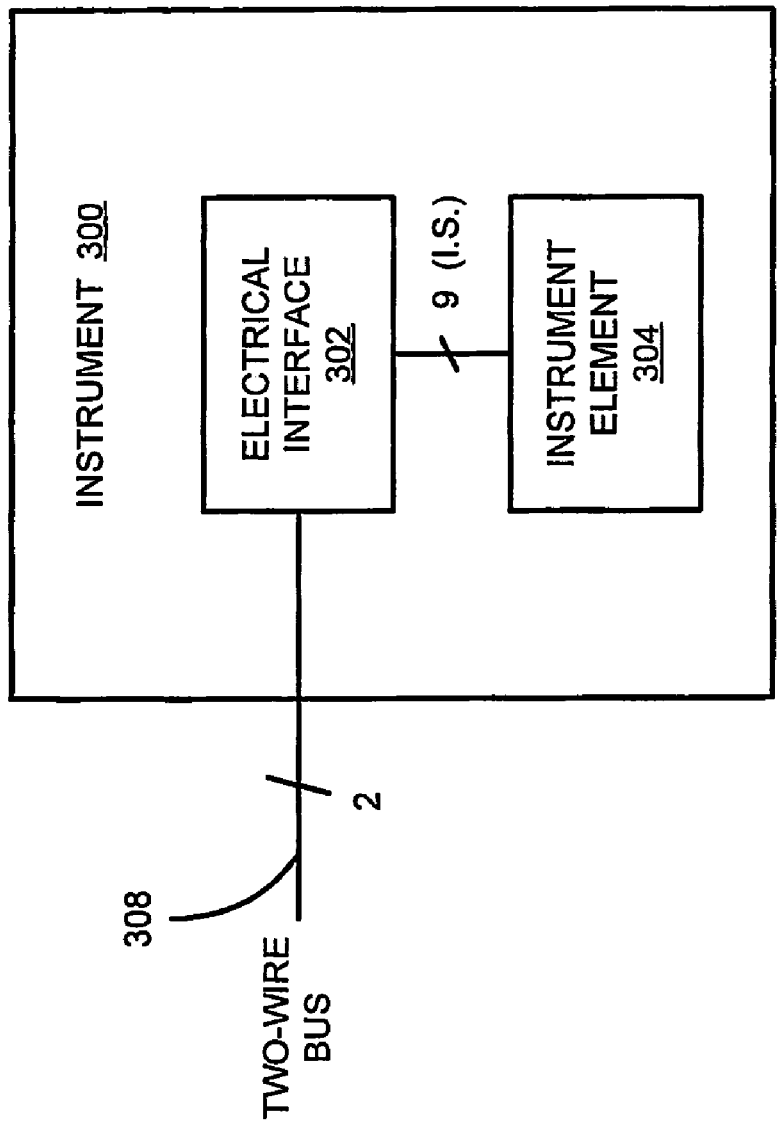
FIG. 3 is a block diagram of an instrument according to an embodiment of the invention.

Instrument—FIG. 3

FIG. 3 is a block diagram of an instrument 300 according to an embodiment of the invention. The instrument 300 includes an instrument element 304 and an electrical interface 302. The electrical interface 302 is connected to the instrument element 304 and is connected to a two-wire bus 308.

Because the instrument 300 in one embodiment can be the only device connected to a bus conditioner device (see FIG. 4 and the accompanying discussion), the electrical interface 302 can draw approximately all of the available electrical current and electrical power from the two-wire bus 308. For example, the instrument 300 can draw up to about 130 milliamps (mA) from an entirely I.S. FIELDBUS™. In some applications, depending on the approval location and the characteristics of the hazardous environment, this 130 mA electrical current is the maximum current amount a FIELDBUS™ bus conditioner device can provide under I.S. limitations. Therefore, the instrument 300 can be an entirely intrinsically safe device, if desired, without the need for electrical barrier devices and the need for an additional, external power supply. In addition, the instrument 300, because it is entirely intrinsically safe, does not require a bulky and expensive explosion-proof housing. Alternatively, the instrument 300 can be used in non-hazardous or low hazard environments.

The two-wire bus 308 can provide all electrical power to the instrument 300 and can provide digital communications between the instrument 300 and other devices. An impedance of the two-wire bus instrument 300 in one embodiment is substantially constant while the two-wire bus is conducting communications. The two-wire bus 308 can provide electrical power that is current, voltage, and power limited. The two-wire bus 308 can provide intrinsically safe (I.S.) electrical current and voltage. The two-wire bus 308 in some embodiments can provide up to about 130 mA of electrical current to the instrument 300 and can typically provide up to about 15 volts (V). However, depending on the capability of ignition in the environment, greater voltage and current levels can be used (and other hazardous location standards can be followed).

The instrument element 304 can consume electrical power and produces one or more signals, such as sensor measurement signals that are related to physical phenomena. The instrument element 304 can comprise any manner of sensors, transducers, drivers, etc., and combinations thereof. In one embodiment, the instrument element 304 comprises a flowtube driver that vibrates a flowtube and further comprises one or more pickoff sensors that sense the vibration of the flowtube. The one or more pickoff sensors can modulate the electrical current and/or the phase relationship of the electrical current flowing through the instrument element 304 to produce the sensor measurement signals. The instrument element 304 can comprise a Coriolis flowtube, a turbine flowmeter, a magnetic flowmeter, etc.

The electrical interface 302 interfaces between the instrument element 304 and the two-wire bus 308. The electrical interface 302 provides electrical power to the instrument element 304 (and to any associated processing circuitry) in a manner consistent with the characteristics of the two-wire bus 308. The electrical interface 302 also conducts digital communications over the two-wire bus 308. Therefore, the electrical interface 302 provides electrical power for a communication system, provides electrical power for a driver element, and provides electrical power for a signal processor and associated sensor(s).

The electrical interface 302 can be I.S. capable and can be connected to an I.S. two-wire bus. However, the electrical interface 302 does not have to perform overall current, voltage, and power limiting where the I.S. two-wire bus 308 is fully I.S. This can advantageously eliminate the need for electrical barrier devices within the instrument 300. This can also advantageously eliminate the need for a bulky and costly explosion-proof housing for the instrument 300. Moreover, it can eliminate the need for a separate, external power source, with the accompanying cost, wiring, and barrier requirements.

The instrument 300 can optionally include an explosion-proof housing as an extra level of security. The instrument 300 can further optionally utilize other protection methods known in the art.

Figure 4:
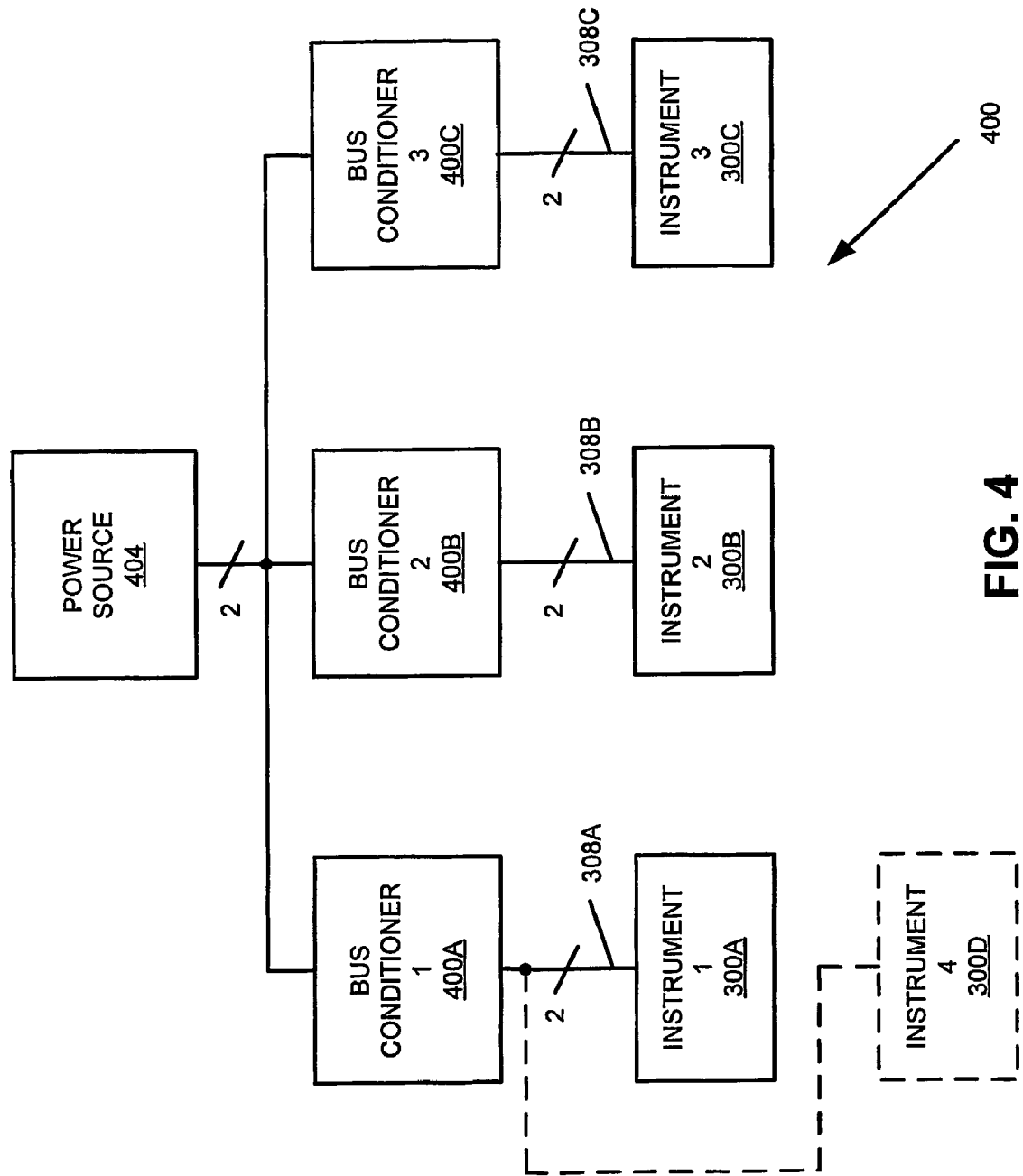
FIG. 4 shows an operating environment that includes three instruments.

Operating Environment—FIG. 4

Figure 1:
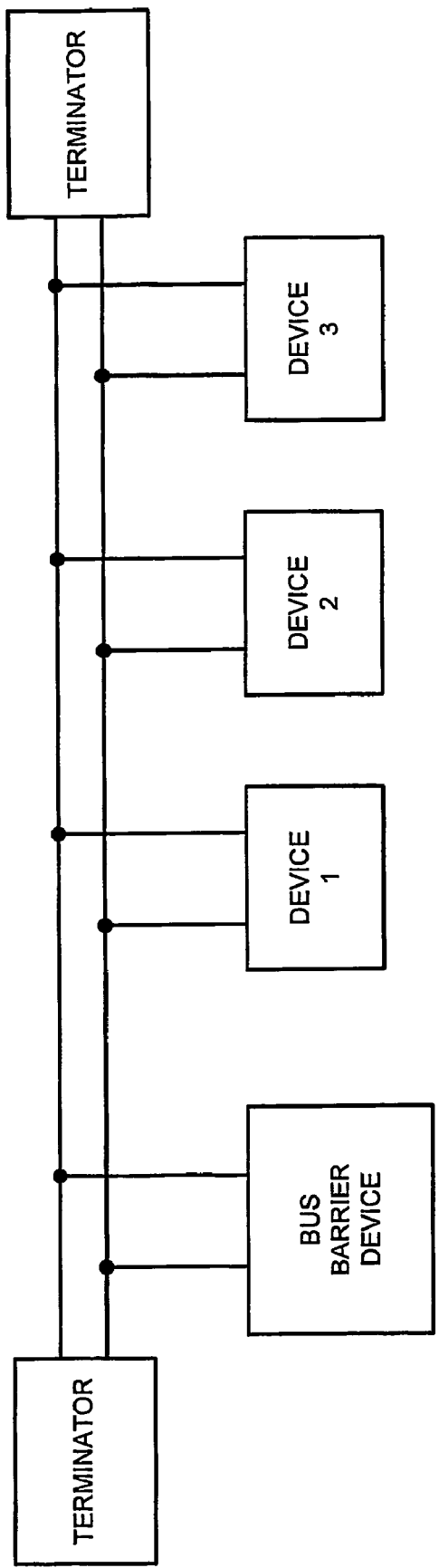
FIG. 1 shows a two-wire bus according to the prior art, such as a FIELDBUS™ two-wire bus commonly used for industrial instrumentation.
Figure 2:
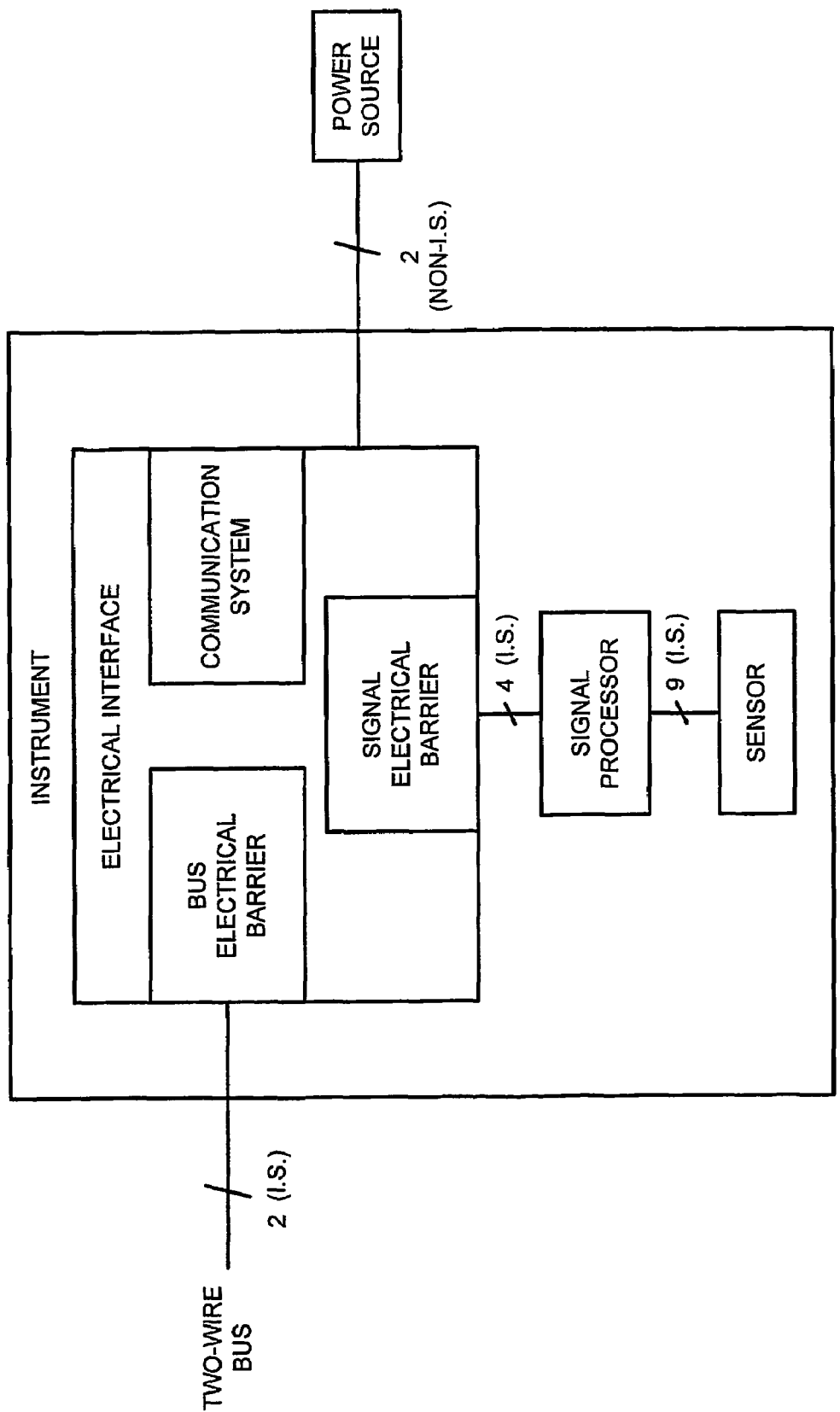
FIG. 2 shows a typical prior art instrument connected to a two-wire bus, showing how electrical power from the two-wire bus is used.

FIG. 4 shows an operating environment 400 that includes three instruments 300A, 300B, and 300C. Each instrument 300A, 300B, and 300C is connected to a corresponding bus conditioner 400A, 400B, and 400C by a two-wire bus 308A, 308B, and 308C (bus terminator devices are not shown for purposes of clarity). The two-wire busses 308A-308C can be I.S. or non-I.S. busses. The bus barriers 400A, 400B, and 400C are connected to a power source 404, which does not have to be an I.S. power supply device. The bus barriers 400A, 400B, and 400C provide the electrical isolation and current, voltage, and power limiting to each of the two-wire busses 308A, 308B, and 308C. The instruments 300A, 300B, and 300C can draw the full amount of electrical power supplied through the bus conditioner devices 400A, 400B, and 400C. This is in contrast to the prior art approach that is shown in FIG. 1. Alternatively, multiple instruments 300 can be connected to a single bus conditioner 400 (see dashed lines).

Figure 5:
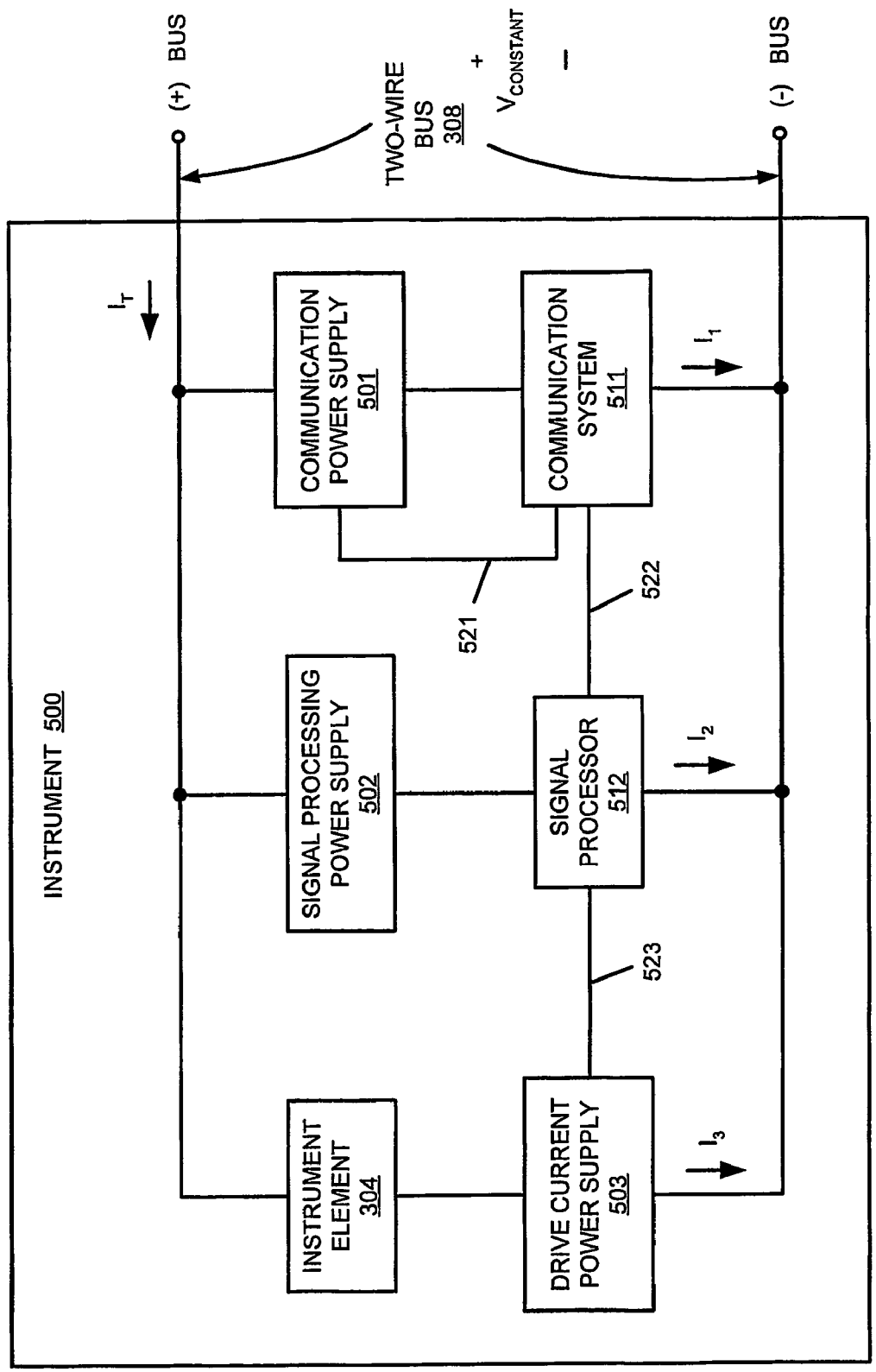
FIG. 5 is a diagram of an instrument according to an embodiment of the invention.

Instrument—FIG. 5

FIG. 5 is a diagram of an instrument 500 according to an embodiment of the invention. Reference numerals in common with previous figures indicate common components. The instrument 500 includes a communication system 511, a signal processor 512, and the instrument element 304. The instrument 500 further includes a communication power supply 501, a sensor power supply 502, and a drive current power supply 503. The instrument 500 is designed for use with the two-wire bus 308.

The instrument 500 can comprise flowmeter electronics, for example. The instrument 500, in the various embodiments shown and discussed herein, can comprise a flowmeter transmitter that generates and transmits flowmeter measurement signals. More particularly, the instrument 500 can comprise a Coriolis flowmeter transmitter that generates and transmits flowmeter signals that are measured via a Coriolis flow tube apparatus.

The two-wire bus 308 in one embodiment comprises a FOUNDATION FIELDBUS™ standard compliant two-wire bus. The FOUNDATION FIELDBUS™ physical layer signaling mechanism requires constant characteristic impedance over a defined frequency band. Accordingly, devices on the bus transmit data by varying the current they draw at a particular signaling frequency. Devices on the bus receive data by observing the voltage developed across the characteristic impedance as a result of the current change.

One ramification of this mechanism is that DC current may be drawn from the bus without affecting communication, because it does not change the AC characteristic impedance. Another ramification of this mechanism is that the instrument 500 must not allow changes in current that might be fast enough to be interpreted in the FIELDBUS™ protocol as a communication signal. When the instrument 500 comprises a flowmeter, rapid changes in sensor current may not be immediately possible because of this constraint. One situation where this can happen is when air bubbles are entrained in a liquid material flowing through the flowmeter, for example.

A bus conditioner device 400 (see FIG. 4) can provide, if required, an intrinsically safe level of electrical current, voltage, and power over the two-wire bus 308. A bus conditioner device 400 in one embodiment can comprise a Fieldbus Intrinsically Safe COncept (FISCO) FIELDBUS™ barrier device. The instrument 500 according to the invention can be designed to draw substantially the maximum available current from the bus conditioner device 400. This is done while regulating the total device current $I_T$ so as to maintain characteristic impedance required for communication and while providing regulated DC voltage for support circuitry (see also FIG. 6 and the accompanying discussion). Alternatively, the instrument 500 can draw less than the maximum available current and therefore multiple instruments 500 can be connected to a single bus conditioner device 400.

The communication power supply 501, the signal processing power supply 502, and the drive current power supply 503 can comprise current regulating devices. Such current regulating power supplies are utilized in series with the other elements across the two-wire bus 308 in order to take advantage of the high output impedance that is characteristic of a current source. This prevents internal impedances of the instrument 500 (such as sensor loading, DSP current draw, or other internal reactive components) from impacting the external characteristic impedance seen at the two-wire bus 308. Therefore, the three independent power supplies/current sources control the first (communications transmit) current $I_1$, the third (sensor drive) current $I_3$, and the second (signal processing) current $I_2$ required to power the signal processor 512 (or the signal processor 512 and associated circuitry see FIG. 6).

The instrument element 304 receives electrical power from the drive current power supply 503 and modulates the drive current in some manner. The instrument element 304 in one embodiment comprises one or more flowtube pickoff sensors, such as Coriolis flowtube pickoff sensors, for example. Each pickoff sensor modulates an electrical current based on the motion of the flowtube, wherein the phase difference between sensor measurement signals is representative of the mass flow rate of the flowing material.

The signal processor 512 receives electrical power from the signal processing power supply 502. In addition, the signal processor 512 sends a drive current level signal to the drive current power supply 503 over a bus or line 523. The drive current level signal controls the drive current flowing through an active element of the instrument element 304, such as by a flowtube driver, for example. The signal processor 512 also receives sensor measurement signals over the bus or line 523, as modulated by the instrument element 304. The signal processor 512 can perform calibrations and manipulations of the sensor measurement signals in order to generate a data signal representative of the mass flow rate and/or density of the material.

Via the bus or line 523, the signal processor 512 can regulate the third current $I_3$, such as regulating and/or limiting the drive current during occurrences of large changes in mass flow rate. In addition, the drive current power supply 503 can limit the rate of change in the third current $I_3$ through the instrument element 304 in order to avoid interfering with digital communications over the two-wire bus 308. The drive current power supply 503 can limit current changes to occur at rates (i.e., frequencies) that will not interact with the typical 32 kHz band communications rate.

The communication system 511 receives electrical power from the communication power supply 501. The communication system 511 can include a feedback path 521 that allows the communication system 511 to control/modulate the first current $I_1$ supplied by the communication power supply 501. The communication system 511 receives a data signal from the signal processor 512 over a bus or line 522 and generates a digital communication signal that is transmitted over the two-wire bus 308.

The communication system 511 generates outgoing digital communication signals by modulating the current flow on the two-wire bus 308, in a frequency band centered around 32 kHz. For example, the first current $I_1$ can comprise two discrete current levels $I_{1A}$ and $I_{1B}$ that reflect a digital one representation or a digital zero representation. Therefore, the second current $I_2$ can be controlled by the signal processing power supply 502 so that the second current $I_2$ is substantially DC.

In a flowmeter application, the third current $I_3$ can vary in response to a flow of material in a flowtube of the flowmeter. Consequently, the change in the total current $I_T$ can reflect only the changes in the first current $I_1$, i.e., the change in the total current $I_T$ reflects just the digital communication signal. In one embodiment, this is done by shunting excess current through the signal processing power supply branch of the instrument 500, as will be discussed in conjunction with FIG. 6. In addition, the communication system 511 can receive digital signals over the two-wire bus 308, such as commands, calibrations, etc., and can relay them to the signal processor 512.

Figure 6:
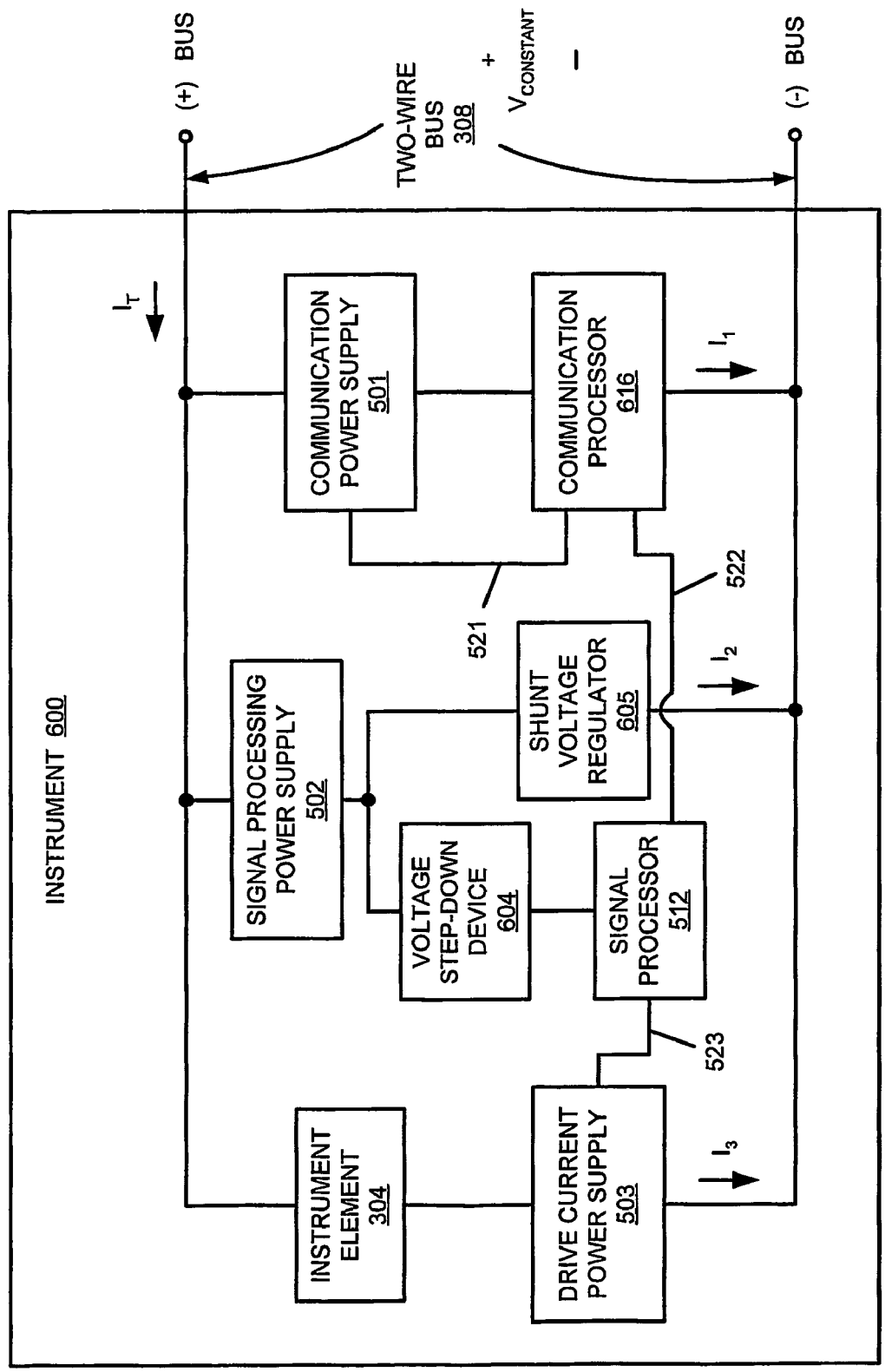
FIG. 6 is a diagram of an instrument according to another embodiment of the invention.

Instrument—FIG. 6

FIG. 6 is a diagram of an instrument 600 according to another embodiment of the invention. Reference numerals in common with previous figures indicate common components. The instrument 600 in this embodiment includes the communication power supply 501, the signal processing power supply 502, the drive current power supply 503, and the instrument element 304. In this embodiment, the signal processor 512 can comprise a digital signal processor (DSP) and can further comprise a voltage step down device 604, and a shunt voltage regulator 605. In addition, in this embodiment the communication system 511 comprises a communication processor 616.

The signal processor 512 receives the drive current level signal and the sensor measurement signals from the drive current power supply 503. The signal processor 512 processes the sensor measurement signals to obtain a mass flow rate of a material flowing through a flowtube associated with the instrument 600. In addition, the signal processor 512 can provide a feedback signal to the drive current power supply 503 that can regulate the drive current, as previously discussed.

The shunt voltage regulator 605 is added in series with the signal processing power supply 502 in order to prevent saturation of the signal processing power supply 502 when the current draw of the signal processor 512 is less than the digital current source set point. The shunt voltage regulator shunts excess current not required by the signal processor 512, in order to maintain a substantially constant voltage to the voltage step-down device 604.

The voltage step-down device 604 converts the voltage supplied to the signal processor 512 to a lower voltage level. Therefore, the voltage available from the two-wire bus 308 does not affect the voltage supplied to the signal processor 512. The voltage step-down device 604 can comprise a DC voltage regulator chip or circuit, for example.

The communication processor 616 receives a data signal from the signal processor 512. The communication processor 616 can measure the first (i.e., communication) current $I_1$ and modulate the current draw on the two-wire bus 308 in order to communicate the data signal over the two-wire bus 308 as a digital, direct current (DC) communication signal, as previously discussed.

Figure 7:
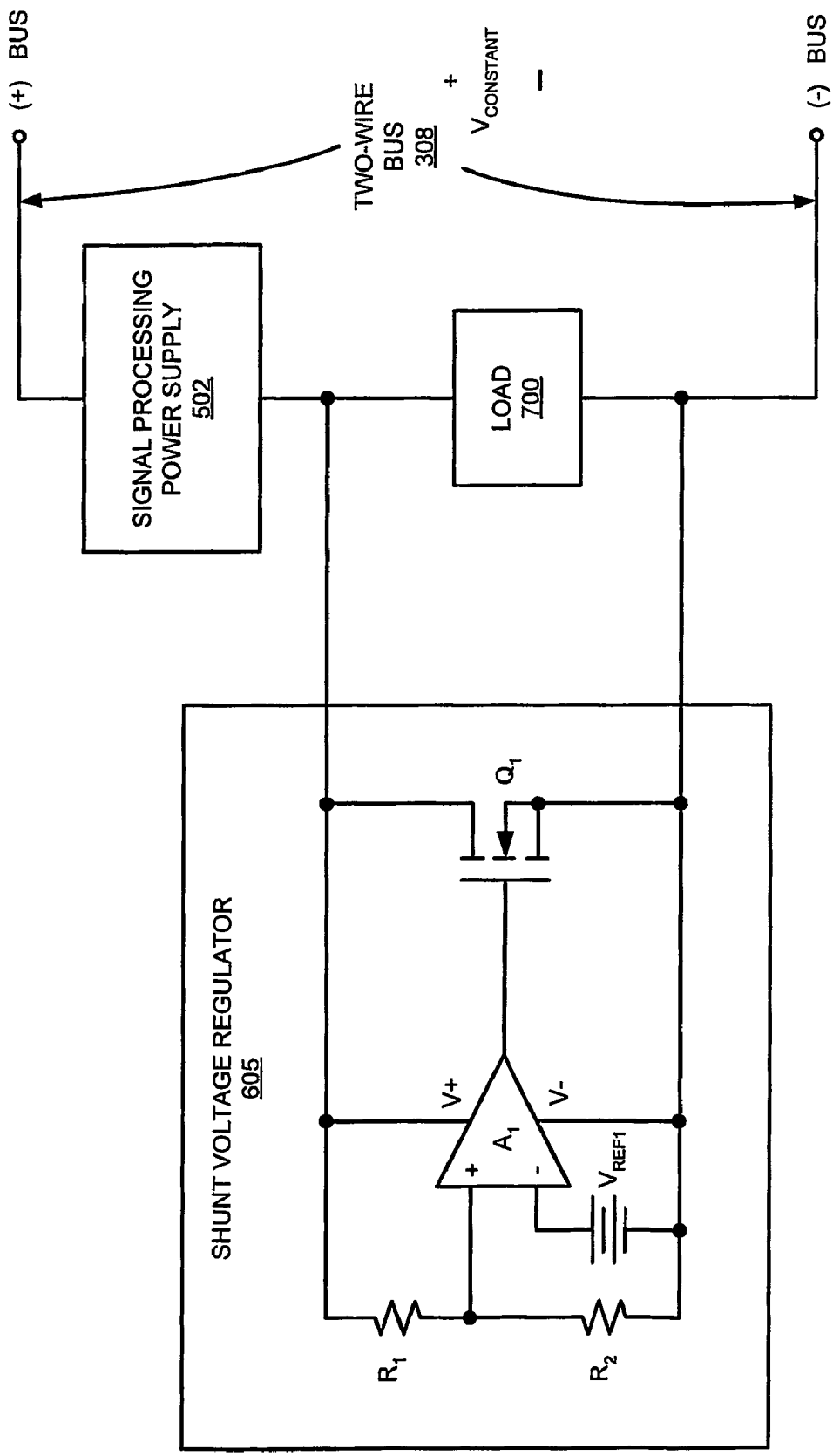
FIG. 7 shows detail of a shunt voltage regulator according to an embodiment of the invention.

Shunt Voltage Regulator—FIG. 7

FIG. 7 shows detail of the shunt voltage regulator 605 according to an embodiment of the invention. In the embodiment shown, the shunt voltage regulator 605 includes an amplifier $A_1$, a transistor $Q_1$, resistors $R_1$ and $R_2$, and a voltage source $V_{REF1}$.

The transistor $Q_1$ can comprise any suitable transistor, such as a power transistor. One suitable type of transistor is a Metal Oxide Semiconductor Field Effect Transistor (MOSFET), which is capable of handling high current levels. The transistor $Q_1$ in the embodiment shown comprises an n-channel enhancement type MOSFET, such as an IRF220 MOSFET transistor, available from International Rectifier, El Segundo, Calif.

The amplifier $A_1$ can comprise any suitable amplifier, such as an operational amplifier. The positive input of the amplifier $A_1$ is biased by a voltage divider network comprising resistors $R_1$ and $R_2$. In one embodiment, $R_1$ has a value of about 50 k ohms, and $R_2$ has a value of about 5 k ohms, providing an input voltage at the positive input of about 5/55 of the bus voltage. Other values can be used. The voltage reference $V_{REF1}$ provides a substantially constant voltage to the negative amplifier input of the amplifier $A_1$. In one embodiment, the voltage reference $V_{REF1}$ provides about 2.5 volts to the negative amplifier input. The voltage reference $V_{REF1}$ can comprise a voltage regulator or other device that provides a substantially constant voltage. Alternatively, the voltage reference $V_{REF1}$ can comprise a separate power source, such as a battery.

In operation, the shunt voltage regulator 605 biases the transistor $Q_1$ so as to regulate the current through the resistors $R_1$ and $R_2$ and therefore maintain a substantially constant voltage $V_{CONSTANT}$ across the load 700. The load 700 can comprise a resistive/capacitive load.

Figure 8:
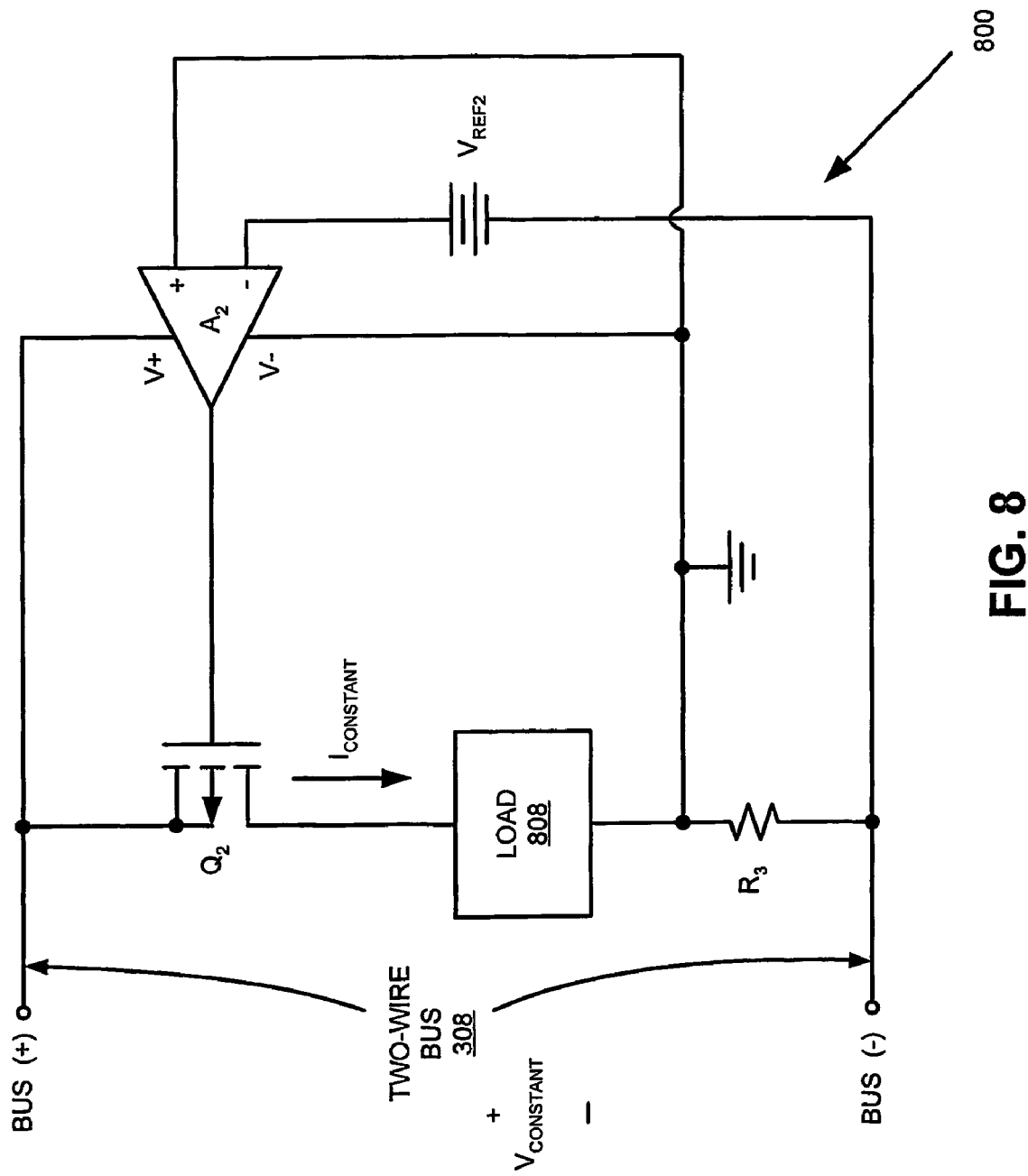
FIG. 8 shows detail of a current controlling circuit according to an embodiment of the invention.

Current Limiting Circuit—FIG. 8

FIG. 8 shows detail of a current controlling circuit 800 according to an embodiment of the invention. The current controlling circuit 800 can be used in any of the communication power supply 501, the signal processing power supply 502, and the drive current power supply 503. The current controlling circuit 800 can be used in combination with the shunt voltage regulator 605, wherein the load 808 and the load 700 comprise one common load. The current controlling circuit 800 includes a transistor $Q_2$, an amplifier $A_2$, a resistor $R_3$, and a voltage source $V_{REF2}$. The current controlling circuit 800 limits the current flowing through the load 808, and therefore provides a substantially constant current draw $I_{CONSTANT}$ through the load 800. The load 808 can comprise a resistive/capacitive load.

The transistor $Q_2$ can comprise any suitable transistor, such as a power transistor, including a MOSFET transistor. The transistor $Q_2$ in the embodiment shown comprises a p-channel enhancement type MOSFET, such as an IRF 9130 MOSFET transistor, available from International Rectifier, El Segundo, Calif.

The amplifier $A_2$ can comprise any suitable amplifier, such as an operational amplifier. The positive input of the amplifier $A_2$ is biased by the voltage generated by the fixed current $I_{CONSTANT}$ flowing through the biasing resistor $R_3$. In one embodiment, $R_3$ has a value of about 10 ohms. When $I_{CONSTANT}$ is about 130 milliamps, the voltage at the positive amplifier input is about 1.3 volts. However, other values can be used.

The voltage reference $V_{REF2}$ provides a substantially constant voltage to the negative amplifier input of the amplifier $A_2$. In one embodiment, the voltage reference $V_{REF2}$ provides about one volt to the negative amplifier input. The voltage reference $V_{REF2}$ can comprise a voltage regulator or other device that provides a substantially constant voltage. Alternatively, the voltage reference $V_{REF2}$ can comprise a separate power source, such as a battery.

In operation, the amplifier $A_2$ is biased by a substantially constant voltage and biases the transistor $Q_2$ to maintain a substantially fixed output current $I_{CONSTANT}$. If $I_{CONSTANT}$ rises or falls, the voltage across the biasing resistor $R_3$ changes, adjusting the output of the amplifier $A_2$ and therefore compensating the biasing of the transistor $Q_2$.

An instrument according to the invention can be constructed according to any of the embodiments in order to provide several advantages. The instrument can be constructed to be entirely intrinsically safe, if desired. The instrument can be constructed to exclude non-I.S. components or portions. The ability to use a bus conditioner device for a single instrument enables the instrument to be constructed without the need for electrical barrier devices/circuits within the instrument. In one embodiment, the use of a bus conditioner device for each instrument enables the instrument to be constructed without the need for a specialized housing for the instrument, such as an explosion-proof housing.

What is claimed is:

1. A two-wire bus instrument (500) adapted for use with a two-wire bus (308), comprising an instrument element (304) that receives a third current and that generates one or more sensor measurement signals, a signal processor (512) that receives a second current and that processes the one or more sensor measurement signals from the instrument element (304) to produce a data signal, and a communication system (511) that receives a first current and that receives the data signal from the signal processor (512), generates a digital communication signal including the data signal, and modulates the digital communication signal onto the two-wire bus (308);

wherein the two-wire bus instrument (500) is further characterized by:
  a communication power supply (501) connected to the communication system (511) and wherein the communication power supply (501) and the communication system (511) are capable of being connected across the two-wire bus (308), with the communication power supply (501) being configured to provide the first current, a substantially constant voltage, and a first power to the communication system (511);
  a signal processing power supply (502) connected to the signal processor (512) and wherein the signal processor (512) and the signal processing power supply (502) are capable of being connected across the two-wire bus (308) and in parallel with the communication power supply (501) and the communication system (511), with the signal processing power supply (502) being configured to provide the second current, a substantially constant voltage, and a second power to the signal processor (512);
  a drive current power supply (503) connected to the instrument element (304) and wherein the instrument element (304) and the drive current power supply (503) are capable of being connected across the two-wire bus (308) and in parallel with the communication power supply (501) and the communication system (511) and further in parallel with the signal processing power supply (502) and the signal processor (512), with the drive current power supply (503) being configured to provide the third current, a substantially constant voltage, and a third power to the instrument element (304).

2. The two-wire bus instrument of claim 1, wherein the two-wire bus instrument comprises a flowmeter transmitter.

3. The two-wire bus instrument of claim 1, wherein the two-wire bus instrument comprises a flowmeter transmitter and the instrument element comprises at least one flowtube driver and one or more pickoff sensors.

4. The two-wire bus instrument of claim 1, wherein the two-wire bus instrument comprises a Coriolis flowmeter transmitter.

5. The two-wire bus instrument of claim 1, wherein the two-wire bus instrument is substantially Intrinsically Safe (I.S.).

6. The two-wire bus instrument of claim 1, wherein an impedance of the two-wire bus instrument is substantially constant while the two-wire bus instrument is conducting communications.

7. The two-wire bus instrument of claim 1, wherein a change to the third current flowing through the instrument element is limited to frequencies that do not interact with communication frequencies of the two-wire bus.

8. A two-wire bus instrument (600) adapted for use with a two-wire bus (308), comprising an instrument element (304) that receives a third current and that generates one or more sensor measurement signals, a signal processor (512) that receives a second current and that processes the one or more sensor measurement signals from the instrument element (304) to produce a data signal, and a communication processor (616) that receives a first current and that receives the data signal from the signal processor (512), generates a digital communication signal including the data signal, modulates the digital communication signal onto the two-wire bus (308), and transfers a first current level command to a communication power supply (501);

wherein the two-wire bus instrument (600) is further characterized by:
  the communication power supply (501) connected to the communication processor (616) and wherein the communication power supply (501) and the communication processor (616) are capable of being connected across the two-wire bus (308), with the communication power supply (501) being configured to provide the first current, a substantially constant voltage, and a first power to the communication processor (616), wherein the first current is provided substantially according to the first current level command;
  a voltage step-down device (604) connected between a signal processing power supply (502) and the signal processor (512) and configured to supply a predetermined voltage level to the signal processor (512);
  a shunt voltage regulator (605) connected to the signal processing power supply (502) and the voltage step-down device (604), wherein the shunt voltage regulator (605) shunts excess current not required by the signal processor (512);
  the signal processing power supply (502) connected to the voltage step-down device (604) and the shunt voltage regulator (605) and wherein the signal processing power supply (502), the signal processor (512), the voltage step-down device (604), and the shunt voltage regulator (605) are capable of being connected across the two-wire bus (308) and in parallel with the communication power supply (501) and the communication processor (616), with the signal processing power supply (502) being configured to provide the second current, a substantially constant voltage, and a second power to the signal processor (512);
  a drive current power supply (503) connected to the instrument element (304) and wherein the instrument element (304) and the drive current power supply (503) are capable of being connected across the two-wire bus (308) and in parallel with the communication power supply (501) and the communication processor (616) and further in parallel with the signal processing power supply (502), the signal processor (512), the voltage step-down device (604), and the shunt voltage regulator (605), with the drive current power supply (503) being configured to provide the third current, a substantially constant voltage, and a third power to the instrument element (304).

9. The two-wire bus instrument of claim 8, wherein the two-wire bus instrument comprises a flowmeter transmitter.

10. The two-wire bus instrument of claim 8, wherein the two-wire bus instrument comprises a flowmeter transmitter and the instrument element comprises at least one flowtube driver and one or more pickoff sensors.

11. The two-wire bus instrument of claim 8, wherein the two-wire bus instrument comprises a Coriolis flowmeter transmitter.

12. The two-wire bus instrument of claim 8, wherein the two-wire bus instrument is substantially Intrinsically Safe (I.S.).

13. The two-wire bus instrument of claim 8, wherein an impedance of the two-wire bus instrument is substantially constant while the two-wire bus instrument is conducting communications.

14. The two-wire bus instrument of claim 8, wherein a change to the third current flowing through the instrument element is limited to frequencies that do not interact with communication frequencies of the two-wire bus.

15. A method of forming a two-wire bus instrument, comprising an instrument element that receives a third current and that generates one or more sensor measurement signals, providing a signal processor that receives a second current and that processes the one or more sensor measurement signals from the instrument element to produce a data signal, and providing a communication system that receives a first current and that receives the data signal from the signal processor, generates a digital communication signal including the data signal, and modulates the digital communication signal onto the two-wire bus;

wherein the method is further characterized by:

providing a communication power supply connected to the communication system and wherein the communication power supply and the communication system are capable of being connected across the two-wire bus, with the communication power supply being configured to provide the first current, a substantially constant voltage, and a first power to the communication system;

providing a signal processing power supply connected to the signal processor and wherein the signal processor and the signal processing power supply are capable of being connected across the two-wire bus and in parallel with the communication power supply and the communication system, with the signal processing power supply being configured to provide the second current, a substantially constant voltage, and a second power to the signal processor;

providing a drive current power supply connected to the instrument element and wherein the instrument element and the drive current power supply are capable of being connected across the two-wire bus and in parallel with the communication power supply and the communication system and further in parallel with the signal processing power supply and the signal processor, with the drive current power supply being configured to provide the third current, a substantially constant voltage, and a third power to the instrument element.

16. The method of claim 15, wherein the two-wire bus instrument comprises a flowmeter transmitter and the instrument element comprises at least one flowtube driver and one or more pickoff sensors.

17. The method of claim 15, wherein the two-wire bus instrument comprises a Coriolis flowmeter transmitter.

18. The method of claim 15, wherein an impedance of the two-wire bus instrument is substantially constant while the two-wire bus instrument is conducting communications.

19. The method of claim 15, wherein the two-wire bus instrument is substantially Intrinsically Safe (I.S.).

* * * * *